Oct. 8, 1929.                K. KAISSER                  1,730,890
                         AUTOMATIC CLUTCH
                       Filed Nov. 10, 1926          2 Sheets-Sheet 1
Fig. 1.
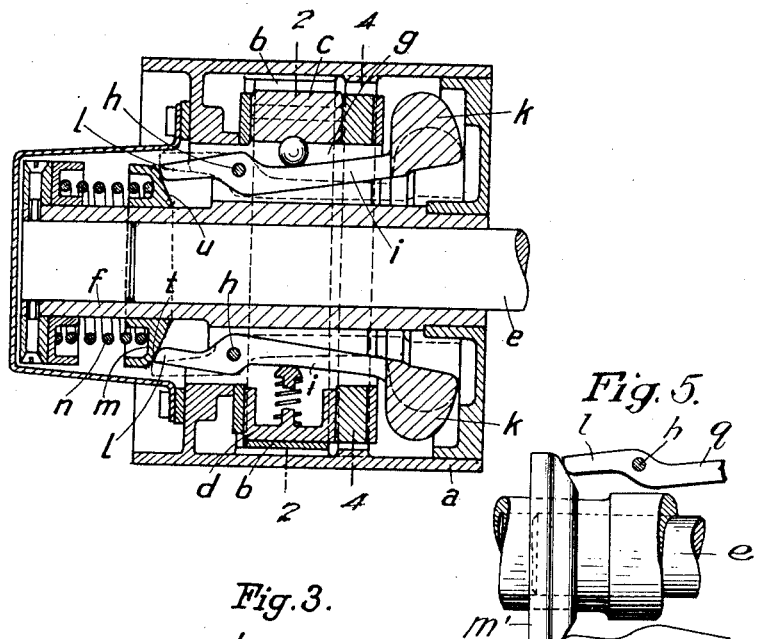
Fig. 5.
Fig. 3.
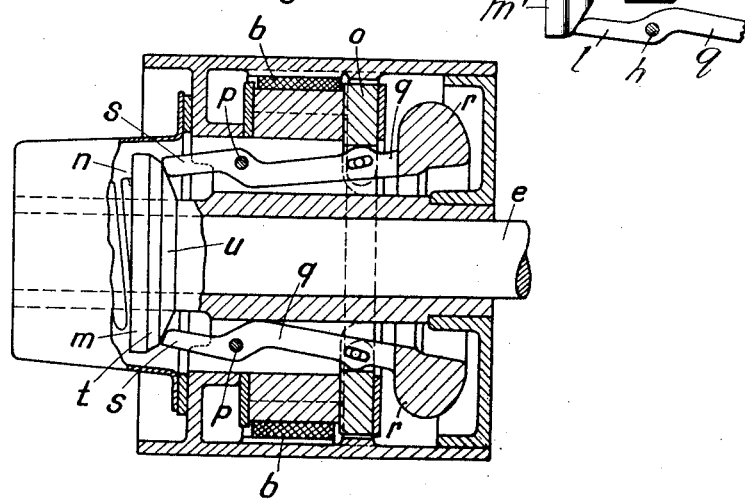
Inventor:
Karl Kaisser Oct. 8, 1929.　　　K. KAISSER　　　1,730,890
AUTOMATIC CLUTCH
Filed Nov. 10, 1926　　　2 Sheets-Sheet 2

Inventor:
Karl Kaisser

Patented Oct. 8, 1929

1,730,890

UNITED STATES PATENT OFFICE

KARL KAISSER, OF MUNICH, GERMANY, ASSIGNOR TO METALLGESELLSCHAFT, AKTIENGESELLSCHAFT, OF FRANKFORT-ON-THE-MAIN, GERMANY, A CORPORATION OF GERMANY

AUTOMATIC CLUTCH

Application filed November 10, 1926, Serial No. 147,544, and in Germany November 26, 1925.

This invention relates to an automatic friction clutch.

Among the various known friction clutches, a prominent part is played by the so-called "expanding ring" friction couplings, the clutch ring of which is pressed apart by two or more opposing thrust members in a radial or tangential direction. Such clutches however have the disadvantage that the clutching and declutching between the driving and the driven parts is not automatic but is effected from outside by means of levers and other devices.

In addition to the above expansion clutches automatic friction clutches are known in which the clutching is automatically effected by the clutch members (for example blocks or the like constructed as friction cheeks or the like) being directly pressed against the part to be driven by centrifugal force and thus carrying that part round with them. The disadvantage of these clutches is that the degree of pressure acting on the clutch members increases and decreases exactly as the speed of the driving parts increases or decreases. Consequently it often happens that the clutching is either effected too early, or that, when declutching, the members of the clutch seize, or if the friction cheeks are held back by suitable springs at the beginning, for the purpose of preventing premature engagement of the clutch, slipping is liable to occur under a small overload or when the speed of the rotary member is slightly reduced.

The aforesaid drawbacks are a source of trouble in many applications, and therefore the employment of an automatic clutch is dispensed with, although such would be of considerable advantage. Thus for example, in order to start electric-motors smoothly (especially polyphase motors with short-circuit armature) it is necessary that the clutching should not come into full operation until the entire line voltage has been imparted to the stator and has developed its full torque.

Moreover it is of great importance that after the clutch is fully engaged, there should not be any slip between the driving and the driven members and that de-clutching cannot occur when speed is reduced (as it may frequently occur in working) but that such de-clutching can occur only when the speed has fallen considerably below the normal, and that de-clutching is therefore desirable.

The object of the invention is an automatic friction clutch by means of which this method of clutching becomes possible in a manner free from any objection.

According to the invention, this is effected by causing the clutch members to be directly or indirectly influenced by special centrifugal bodies, influenced by springs or weights in such manner that the clutch members themselves can at first only exert preliminary clutching action and that the complete engagement, by means of the centrifugal bodies, takes place only after the driving member has attained a predetermined speed or its normal speed whilst declutching is effected only after the speed has fallen considerably.

In addition to the coacting members, the clutch is provided with locking members, influenced by separate centrifugal bodies and adapted to prevent any slipping of the driven member of the clutch. These locking members cannot enter into positive operation until after the clutch is fully engaged and they cannot be released until the speed has fallen considerably.

In order more clearly to understand the invention, reference is made to the accompanying drawings which illustrate by way of example, an embodiment of the invention as applied to an expansion clutch although according to the invention, with suitable mechanical modifications, any other automatic friction clutch can be employed.

In said drawings:—

Fig. 1 is a longitudinal section along the line 1—1 of Fig. 2.

Fig. 3 is a longitudinal section along the line 3—3 of Fig. 2, and

Fig. 5 shows a detail of a slightly modified collar for coaction with the pivoted arms.

Figure 2:
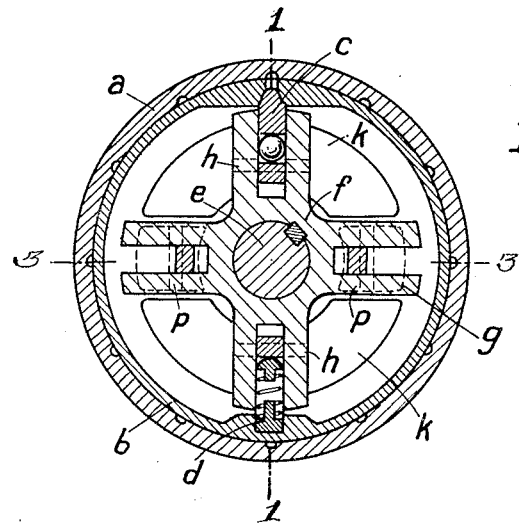
Fig. 2 is a cross-section along the line 2—2 of Fig. 1.
Figure 4:
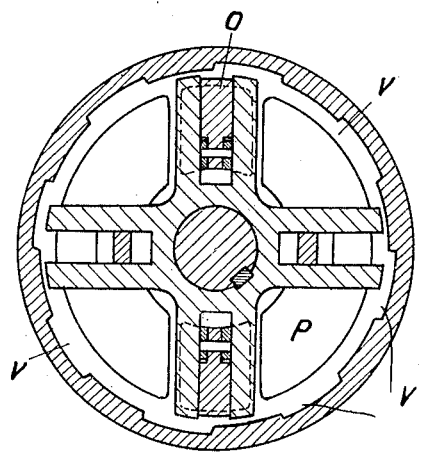
Fig. 4 is a cross-section along the line 4—4 of Fig. 1.

a is the belt pulley, against the inner surface of which bears the split clutch ring b, which may be expanded in known manner by two or more opposing thrust members c and d and thus forced against the pulley. A casting f is keyed on the driving shaft e and forms a cross-piece g opposite the coupling face. In two opposite branches of this cross-piece are mounted the thrust members c and d adapted to be slid in a radial direction. They lie on the cross-piece in the path of movement of two centrifugal members, which project through them, in the form of double levers pivotally mounted at h, the longer arms i of said levers being enlarged at the extremities into heavy centrifugal bodies k, whereas the short arms l bear against spring-controlled collar m adapted to slide axially on the casting f. The collar m is under the influence of a powerful spiral spring n which holds it firmly against the centrifugal lever arms 1.

In the other two, oppositely disposed, arms of the cross-piece g are mounted the radially movable plungers o arranged laterally between the clutch ring and the centrifugal bodies k. These plungers, which act as locking members, are articulated to lighter centrifugal levers q, mounted on pivots p and having their longer arms enlarged to lighter centrifugal bodies r, whilst the shorter arms s also bear against the spring-controlled collar m. For high speeds, the lateral thrust face of the collar m may, as indicated in Fig. 3, be preferably arranged as an inclined surface with a change of pitch, so that the outer portion t tapers slightly in relation to the horizontal, whilst the inner portion u is at a sharper angle. The inner side of the belt pulley a, facing the locking plungers o, is provided with one or more notches v.

The clutch operates in the following manner:—

During idle running, the inner clutch member turns idly inside the stationary belt pulley a, the heavy centrifugal bodies k, then occupying the position marked by dotted lines in Fig. 1, in which the slightly tapered surface t of the collar m presses against the arms l and s of the centrifugal members. In this position, the clutch ring, which is expanded under the influence of its own centrifugal action and that of the thrust members c, and d, already exerts a clutching effect on the belt pulley, and thus sets up a preliminary clutching action without, however, effecting complete engagement. So long as the speed of the driving member has not reached the desired limit, the centrifugal force developed by the bodies k is not sufficient to push the collar m forward against the force of the spring n, and consequently, during the whole of this period, the centrifugal bodies k cannot have any effect on the clutch ring. Only when the normal speed has been attained, does the centrifugal force increase to such an extent that the bodies k slowly overcome the counter pressure of the collar m and come into the position shown by the continuous lines in Fig. 1, in which they bear against the steep surface of the collar m on the one hand, and force the thrust members c, d into the clutch ring on the other. At the same time, the counter pressure of the collar m opposes the bodies k to only a greatly reduced extent, inasmuch as a large part of this counter pressure is taken up by the pivots h, and the clutch ring is pressed firmly against the belt pulley a, thus completely coupling-up the driven member. By this means, all intermittent engagement and release or chattering of the clutch is avoided.

In clutching-in, the speed naturally decreases owing to the load being taken up, but very soon regains its full value. As soon as this occurs, the lighter centrifugal members, which are independent of the expansion ring b, are able to swing out further, thereby imparting an additional thrust to the collar m and forcing the plungers o into the teeth v. In this way they lock the clutch and prevent any slip of the coupled member; whilst on the other hand the pressure of the spiral spring n on the centrifugal members i, k, l is entirely relieved.

Unless the speed falls to an excessive extent, the clutch and locking device are not released in any event, since, as explained, the counter pressure of the spiral spring n acts solely on the two lighter centrifugal levers q, r, s, and their angle in relation to the contact surface of the collar m, when in the final (locked) position, is such that the pivots p absorb nearly the whole of the not inconsiderable pressure of the spring n.

If, however, the speed falls beyond the permissible limit, the effect of the light centrifugal members q, r, s, diminishes so that the spring n comes into operation and forces back the collar m, thereby releasing the locking means in the first place, and then declutching the driven member from the driving member of the clutch.

The clutching and declutching are therefore perfectly automatic, the former being effected the moment the driving member attains normal speed; whilst declutching does not take place until the speed has fallen considerably, for example to one-third the normal.

It may be mentioned that, in the case of clutches for merely small loads with not too high speeds or with lighter centrifugal bodies, the tapered collar m', as shown in Fig. 5, may be used. This collar is one with a surface of constant taper, the pitch of which must be adapted to suit that speed of the driving member at which the clutching-in is to be effected. It will be obvious that the invention is not limited to the exact structure as shown. The number of clutch rings may be varied, as also the plungers, for operating the same. It will also be understood that a four-branch crosspiece *f* is shown, but the number of branches thereof is not limited to four, since any other number may be used.

What I claim is:

1. In a clutch device, a driven member, a driving member therefor, clutch elements therebetween for connecting said members, a lever for actuating said clutch elements, said lever being weighted on one side of its pivot point, and means abutting said lever on the other side of its pivot point opposing movement of said lever by the centrifugal force of said weight, said means comprising a collar movable axially of said driving member.

2. In a clutch device, a rotary shaft, a driving member rotatable therewith, a driven member surrounding said driving member, clutch elements therebetween for connecting said members, a lever pivoted on said driving member for actuating said clutch elements, said lever being weighted on one side of its pivot, and means abutting said lever on the other side of its pivot opposing movement of said lever by centrifugal force, said means comprising an axially movable collar on said driving member and having a sloping face yieldingly engaging said lever as the latter turns about its pivot.

3. The invention as set forth in claim 2, wherein the slope of that portion of said collar engaged by said lever when the driving member is approximately at clutch-engaging speed varies to reduce the declutching force as said lever moves into clutch-engaging position.

4. In a clutch device, a driven member, a driving member, a plurality of pairs of clutch elements therebetween for connecting said members and centrifugally actuated means for causing each pair of clutch elements to engage, said means including a plurality of weighted members, the weights thereof for one pair of clutch elements being of different mass from those of another pair.

5. In a clutch device, a driven member, a driving member, two clutch mechanisms therebetween to connect said members, separate centrifugally operated means to actuate each clutch mechanism, and a common means acting on each of said centrifugally operated means to prevent engagement of either of said clutch mechanisms prior to a predetermined speed.

6. The structure as in claim 5 wherein the common means acting on said centrifugally operated means is constructed and arranged to allow said clutch mechanisms to engage successively.

7. The structure as in claim 5 wherein the separate centrifugal means to actuate each clutch mechanism comprise weighted levers, the weights for one clutch mechanism being of greater mass than that for the other clutch mechanism.

8. The structure as in claim 5 wherein the separate centrifugal means to actuate the clutch mechanisms comprise weighted levers, one of said clutch mechanisms comprises a friction clutch, the other of said clutch mechanisms comprises positive engaging members, and the levers are so weighted that the friction clutch mechanism closes prior to the positive clutch mechanism.

9. In a clutch device, a driven member, a driving member, clutch elements therebetween to connect said members, centrifugally operated means to cause said clutch elements to engage, and spring-pressed means acting in opposition to said centrifugally operated means, characterized by the fact that the spring-pressed means exerts a declutching effect of two distinct orders of magnitude, the first of which is effective prior to engagement of the clutch, and the second of which is of a lower order and effective after engagement of the clutch, the centrifugally operating means including a pivoted lever on the driving member, and the spring-pressed means including a collar on and movable axially of the driving member for engagement with one end of the lever.

In testimony whereof I affix my signature.

KARL KAISSER.